Nov. 5, 1968    W. C. PHILLIPS    3,408,857
TESTING APPARATUS

Filed Feb. 1, 1966    5 Sheets-Sheet 2

INVENTOR
WILLARD C. PHILLIPS
Dominik & Stein
ATTY'S

FIG. 7.

Nov. 5, 1968    W. C. PHILLIPS    3,408,857
TESTING APPARATUS
Filed Feb. 1, 1966    5 Sheets-Sheet 5

FIG. 8

INVENTOR
WILLARD C. PHILLIPS
Dominik & Stein
ATTY'S

United States Patent Office 3,408,857
Patented Nov. 5, 1968

3,408,857
TESTING APPARATUS
Willard C. Phillips, Houston, Tex., assignor to The Dow Chemical Company, Midland, Mich., a corporation of Delaware
Filed Feb. 1, 1966, Ser. No. 524,143
22 Claims. (Cl. 73—45.2)

ABSTRACT OF THE DISCLOSURE

Test method and apparatus for detecting the minimum and maximum acceptable diameters and columnar wall strength of a container, such as a plastic tube, by forcibly inserting a test plug means into the container while correlating the force of insertion to said diameters and wall strength.

---

This invention relates to methods and apparatus for testing and detecting defects in articles.

Quality control is generally accomplished by manual labor, inspecting an established percentage of articles produced. In many cases, manual inspection provides a satisfactory method of quality control. However, when the articles are produced on a mass production basis, at a tremendous rate, the cost of manual labor becomes prohibitive, in view of the number of inspecting personnel required.

This problem is particularly acute in the plastics industry where, for example, one molding machine can turn out hundreds of articles in a relatively short time. If the molding machine is not functioning properly, a substantial backlog of defective or unacceptable articles can be quickly established. Therefore, to eliminate, or reduce, the backlog, large numbers of inspection personnel are required, to keep pace with the production rate of the molding machines.

The problem is further enhanced when molding flexible articles, of plastic, rubber or similar material. In the past, quality control of the flexible articles generally has been limited to dimensional inspection of the articles. Dimensional inspection on an automated basis is possible but it is prohibitively costly, and therefore is normally accomplished with manual labor. In any case, whether it be done with manual labor or on an automated basis, the results are generally unsatisfactory. The flexibility, or unstable condition, of the articles makes it extremely difficult, if not impossible, to gauge dimensions to the tolerances desired.

Accordingly, it is an objet of this invention to provide improved methods and apparatus for testing and detecting defects in articles and, in particular, flexible articles. In this respect, it is further contemplated that the apparatus be completely automatic in operation.

It is another object to provide improved methods and apparatus for testing and detecting defects in articles which are capable of detecting small deviations from established tolerances.

It is still another object to provide apparatus of the above described type which is relatively simple in construction in comparison to existing quality control apparatus.

It is still another object to provide apparatus of the above described type which is capable of inspecting articles accurately, and quickly.

It is still another object to provide apparatus of the above described type which is adapted to test a number of different dimensions and/or features of the article and to clearly indicate by marking the articles the particular defect or defects suffered by the article.

It is still another object to provide improved methods and apparatus of the above described type which during the testing simulates the conditions of the articles during its final or ultimate intended use.

It is still another object to provide improved methods and apparatus of the above described type which is easily adaptable to perform additional tests on an article.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

In the illustrated embodiment, the method and apparatus of the invention are shown adapted to test and detect defective plastic containers having side walls which are semi-rigid in form and have an annular groove therein in which a lid or cover is received and retained. Plastic containers of this type are generally referred to as "tubs," and are used to package products such as sour cream, cottage cheese, potato salad, cole slaw and the like. Inasmuch as these products are subject to spoilage and/or leakage if the container is not sealed tightly, tolerances must be rigidly controlled. Also, in many cases, the products are filled by volume, rather than weight, hence the capacity of the tubs must be rigidly controlled also. While the method and apparatus of the present invention are particularly adapted for testing and detecting these specifications for the tubs, they are also equally applicable for testing a whole host of other articles, for the same, as well as other, specifications.

For a fuller understanding of the nature and objects of the invention, reference should be had to the following detailed description taken in connection with the accompanying drawings, in which.

Similar reference characters refer to similar parts throughout the several views of the drawings.

Figures 1, 2:
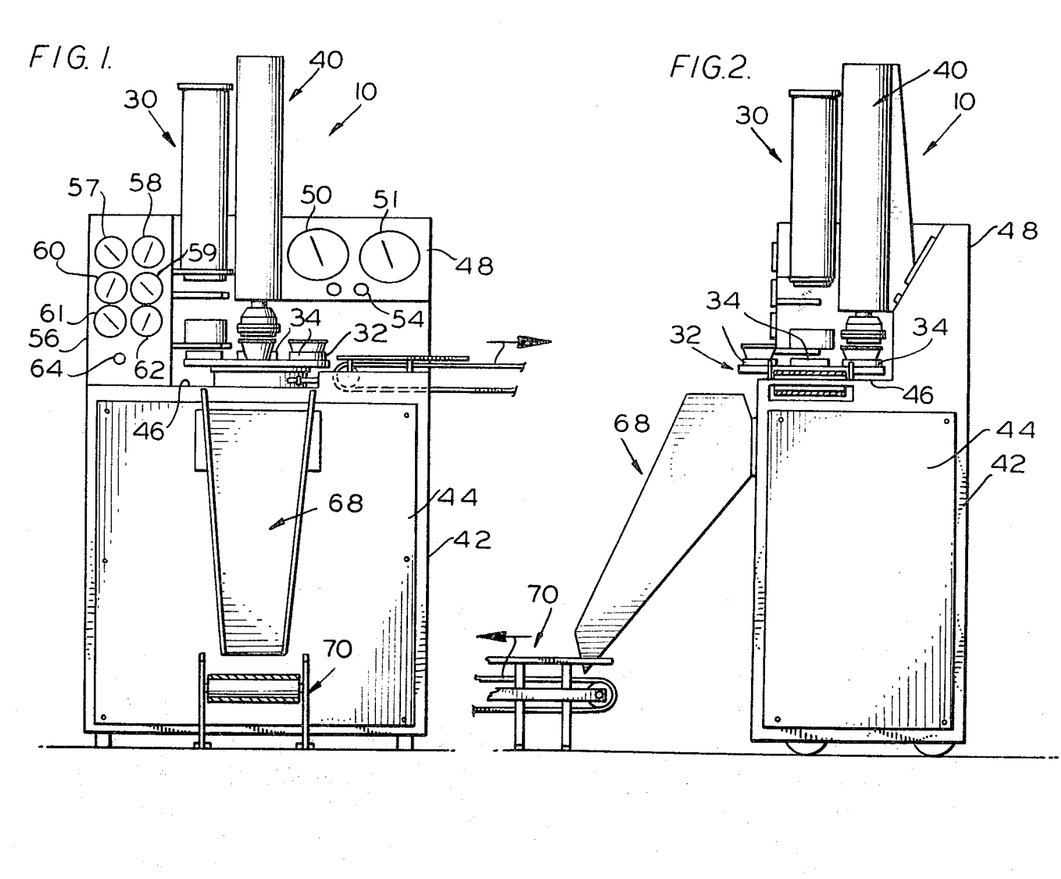
FIG. 1 is a front plan view of testing apparatus exemplary of the invention.
FIG. 2 is a side plan view of the testing apparatus of FIG. 1.

Referring now to the drawings, in FIGS. 1 and 2 there is illustrated a testing machine 10 exemplary of the invention which is particularly adapted to test tubs 12 of the above described type. A representative tub 12 is illustrated, partly sectionalized, in FIG. 3.

The tube 12 is fabricated of plastic which is semi-rigid. Its side wall 14 is circular and tapers inwardly from the top edge of the tub to its bottom. The upper edge of the side wall is folded over to provide a rolled edge 18 which functions both to provide a smooth edge to prevent a party using the tub from being cut with a sharp edge and to provide a gripping surface for a cover or lid (not shown). Below the roller top edge 18, the tapered side wall 14 forms an entrance shoulder 19 which flows into an annular cover or lid groove 20 for a correspondingly shaped lip on a lid (not shown). The lid groove 20 is substantially flat at its lower edge to provide a seat 22 for the lip. The lid is placed over the top of the tub 12, with the lip on its lower end seated in the lid groove 20. Its top edge is folded to substantially correspond to the shape of the rolled edge 18 so that a firm, air-tight seal is provided. Below the annular lid groove 20, the side wall tapers outwardly slightly, partly for decorative purposes and partly for rigidity. The bottom wall 24 is recessed within the interior of the tub, for various reasons. As indicated above, the specifications for the tubs generally require a pre-etstablished tolerance for the entrance shoulder 19 to the lid groove 20, as well as for the lid groove itself. Also, the side wall 14 must be of a predetermined uniform thickness and the bottom wall 24 must be recessed a predetermined depth, the latter being due to the fact that volumetric fill is sometimes used. In such case, the proper depth must be determined, but in other cases, the depth is generally immaterial.

Briefly, in testing the tub 12, a test plug 26 (FIG. 3) which is of a form and diameter that is similar to the actual lid for the tub is inserted into the tub and engaged first with the entrance shoulder 19 and secondly within the annular lid groove 20. A predetermined force which is correlated to permissible tolerances established for the entrance shoulder and for the diameter of the lid groove 20 must be encountered during this operation, otherwise the tub is indicated to be defective. A measured force is next applied to the test plug 26 which creates a columnar load on the tub's side wall 14. The measured force is correlated to the permissible tolerances for wall thickness and if the side wall is unable to support this measured force, the tub is indicated to be defective. The manner and the apparatus for performing these, as well as other tests are set forth in detail below.

Referring now again to FIGS. 1 and 2, the tubs 12 are stacked, either manually or automatically, into a tub dropper 30 mounted upon the testing machine 10, above an indexing table 32. The tub dropper 30 and the indexing table 32 may be of any known constructions which are preferably pneumatically operated and which are adapted or adaptable to drop individual ones of the tubs 12 into respective ones of the stations 34 on the indexing table 32 as the latter is periodically advanced. The indexing table 32 delivers the tubs 12 beneath the test head assembly 40. The testing machine 10 has a cabinet 42 constructed about a frame (not shown) and preferably has a removable cover door 44 on each of its front, back and side walls so that access may be easily made to the electrical, pneumatic and hydraulic control circuitry included therein.

A platform 46 for the indexing table 32 is provided at the top side of the main portion of the cabinet 42, and to the rear of the platform 46 the cabinet has an upright dial support portion 48 which is sloped so that the dials 50 and 51 mounted thereon can be more easily observed and read. Start and stop pushbuttons 54 and 55 are also mounted on the sloped surface of the dial support portion 48.

Beside and to the left (as shown) of the tub dropper 30, the cabinet 42 has another upright dial support portion 56 having dials 57–62 and another start pushbutton 64 mounted thereon. The function of the dials 50, 51 and 57–61 and the pushbutton 56 and 64 are explained below. The described cabinet 42 is representative of a shape and construction which may be used, however, it may assume any one of a number of shapes and constructions so long as it is, or the elements of the testing machine are, functional in the manner hereinafter described.

The testing machine 10 also has a continuous belt conveyor 66 (partly shown) mounted on the platform 46, adjacent the indexing table 32, and a chute 68 mounted to its front wall which leads to another continuous belt conveyor 70. The testing machine 10 is adapted to expel acceptable and defective tubs on to the conveyors 66 and 70, respectively, for transporting them to an inspection or collection station or the like, after they have been tested.

Figure 3:
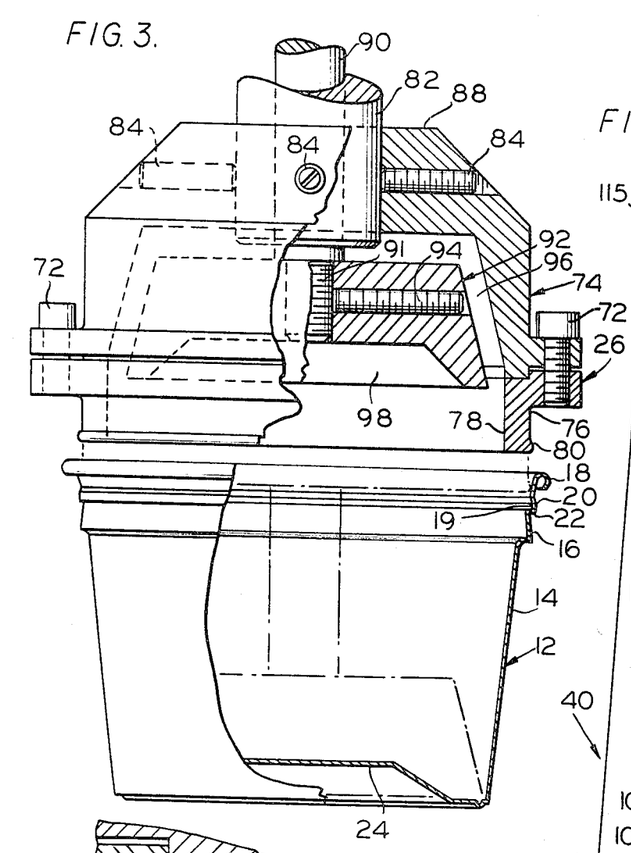
FIG. 3 is an enlarged, partially sectioned, plan view of the testing head of the testing apparatus of FIG. 1.
Figure 4:
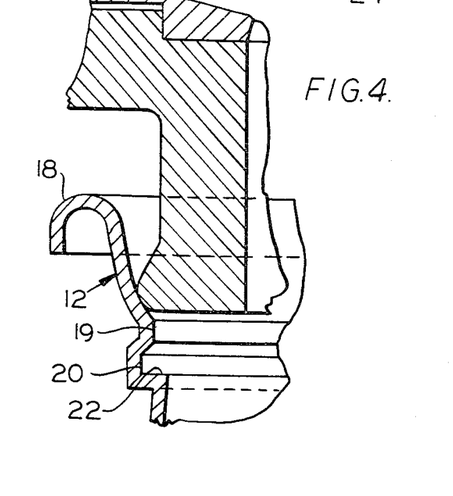
FIG. 4 is an enlarged, partially sectioned view illustrating the manner in which the testing head is seated within the annular lid groove of a container.

IN FIG. 3, it can be seen that the test plug 26 which is forced into the tubs 12 with a controlled or measured force is removably affixed by fastener means such as the threaded screws 72 to a test head 74. The test plug 26 is ring-shaped and has a reduced diameter skirt 76 and a central aperture 78. A lip 80 which substantially corresponds in size and shape to that of the lip groove 20 in the tubs 12 is formed annularly about the lower peripheral edge of the skirt 76.

The test head 4 is substantially cup-shaped and is removably affixed in an inverted cup position to a piston 82 of a hydraulic cylinder 100 by means of fastener means such as the set screws 84. An annular flange 86 extends about the lower peripheral edge of the test head 74 and the threaded screws 72 are passed through apertures formed in it for securing the test plug 26 to the test head.

The piston 82 extends through a top wall 88 of the test head 74, and the end of a piston 90 of an air cylinder 102 extended through and slidably retained within the piston 82. A hold plug 92 is threadedly affixed to the threaded end 91 of the piston 90 so as to be removable, and is fixedly held by a fastener means such as set screw 94. The hold plug 92 is reciprocally operated by the air cylinder 102 to engage the bottom wall 24 of the tubs 12 (as shown in dotted lines), and in its retracted position it is normally confined within an interior cavity 96 of the test head 74. The hold plug 92 has a recessed cavity 98 in its bottom which substantially corresponds in size and shape to the recessed bottom wall 24 of the tubs 12. The hold plug 92, as explained more fully below, functions to hold the tubs 12 so that the test plug 26 can be removed from the tubs 12 and also functions to test the volumetric capacity of the tubs by testing the height of the recess in the bottom wall 24.

Figure 5:
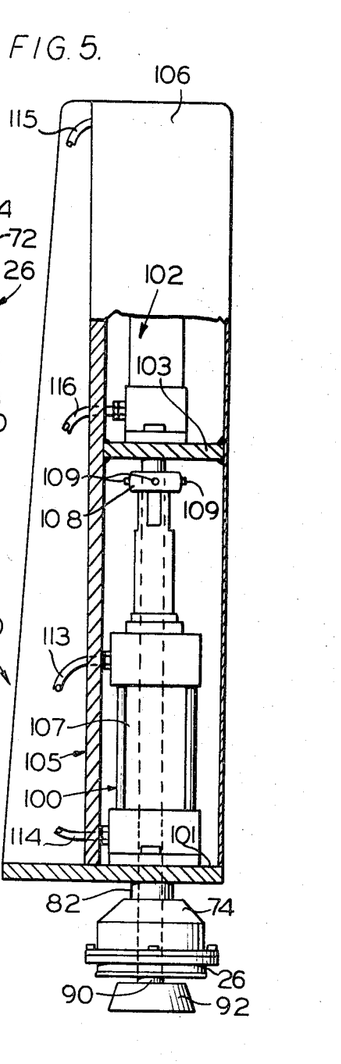
FIG. 5 is a partially sectioned view illustrating the hydraulic and air cylinders used to control the movement of the testing head.

The test head assembly 40 is shown in FIG. 5 and the hydraulic cylinder 100 and the air cylinder 102 are fixed mounted in vertically aligned space relationship upon horizontally disposed members 101 and 103, respectively, of a frame 105. A cover 106 is provided for enclosing the cylinders 102 and 103. The piston 82 of the hydraulic cylinder 100 is hollow and extends completely through the cylinder 107. The test plug 26 is affixed to its lower end, as described above. The piston 90 of the air cylinder 102 extends through the hollow piston 82 and the hold plug 92 is affixed to its lower end, as described above. A collar 108 is fixedly secured by fastener means such as set screws 109 to the piston 90 and the upper end of the piston 82 is formed so as to be slidably retained within the collar 108. The collar 108 functions to maintain proper alignment between the pistons 82 and 90 by holding them in a slidably fixed relationship.

Figure 6:
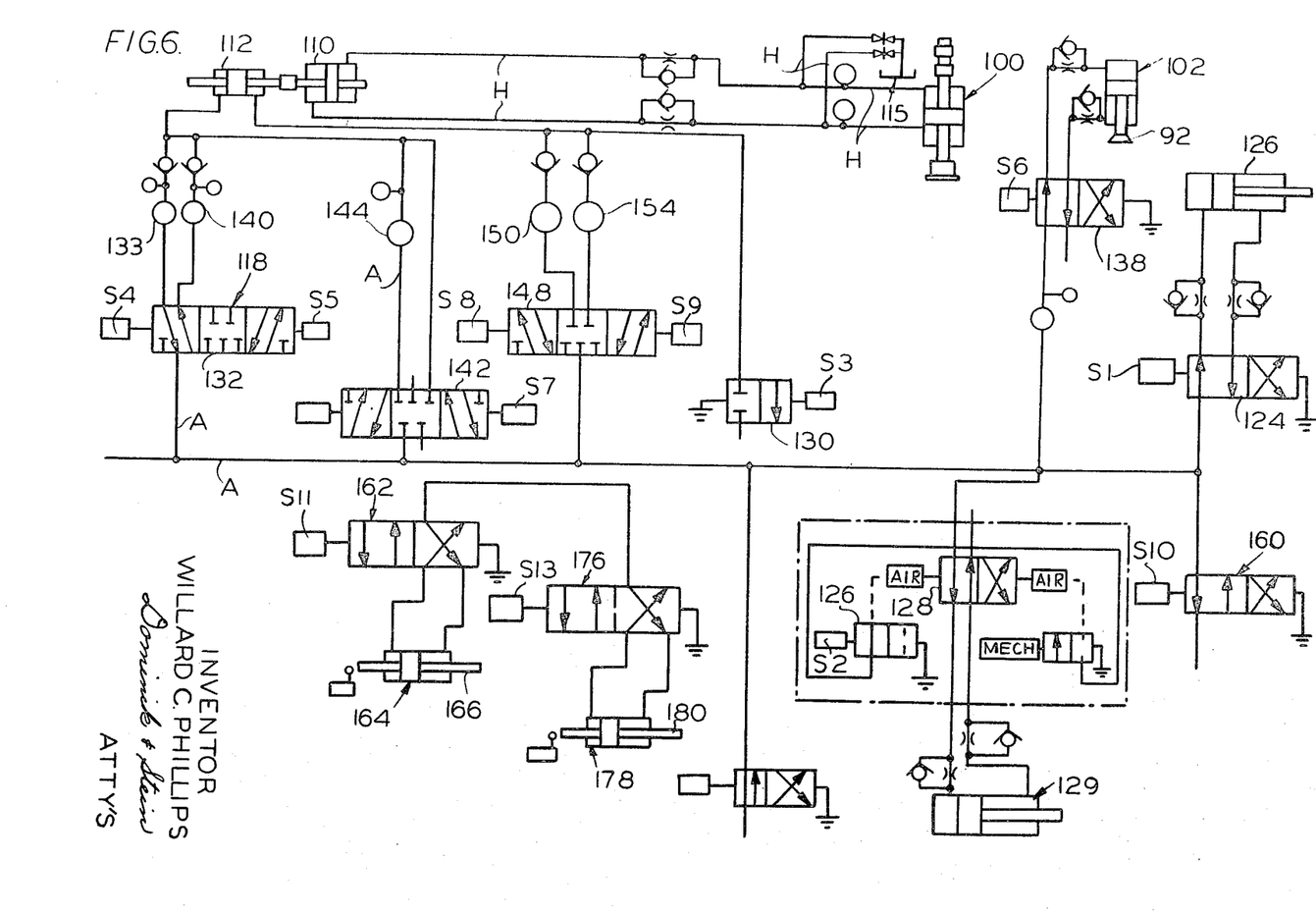
FIG. 6 is a diagram illustrating hydraulic circuitry which may be used with the testing apparatus of FIG. 1.

The hydraulic cylinder 100 receives its supply of pressurized hydraulic fluid from another hydraulic cylinder 110 (FIG. 6) that is acting as a pump. The hydraulic cylinder 110 is, in turn, driven by an air cylinder 112 (FIG. 6). Pressurized hydraulic fluid and air is coupled to the cylinders 100 and 102, respectively, by hydraulic lines, generally represented with the reference letter H and by air lines generally represented by the reference letter A.

With this arrangement, greater control over the forces exerted by the pistons 82 and 90 or, more particularly, the test plug 26 and the hold plug 92, is provided so that greater accurracy in testing is likewise possible.

Figure 7:
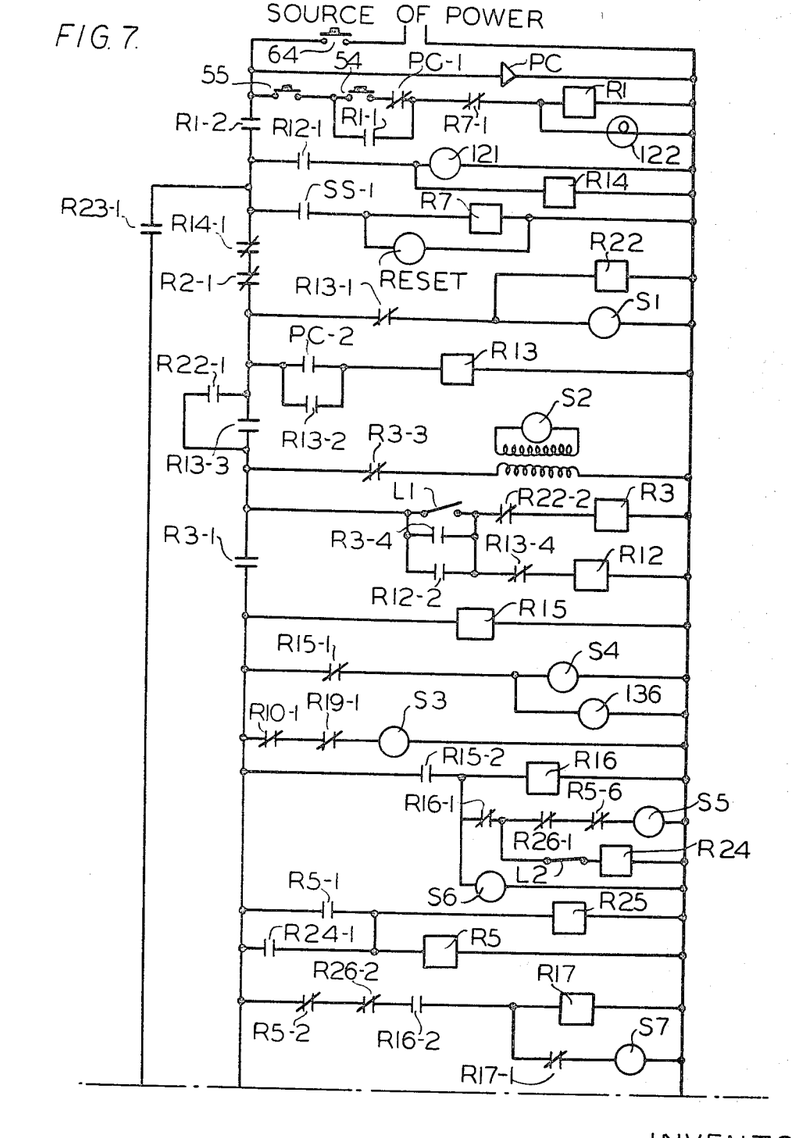
FIGS. 7 and 8, together are a schematic diagram of the electrical circuitry for the testing apparatus of FIG. 1.
Figure 8:
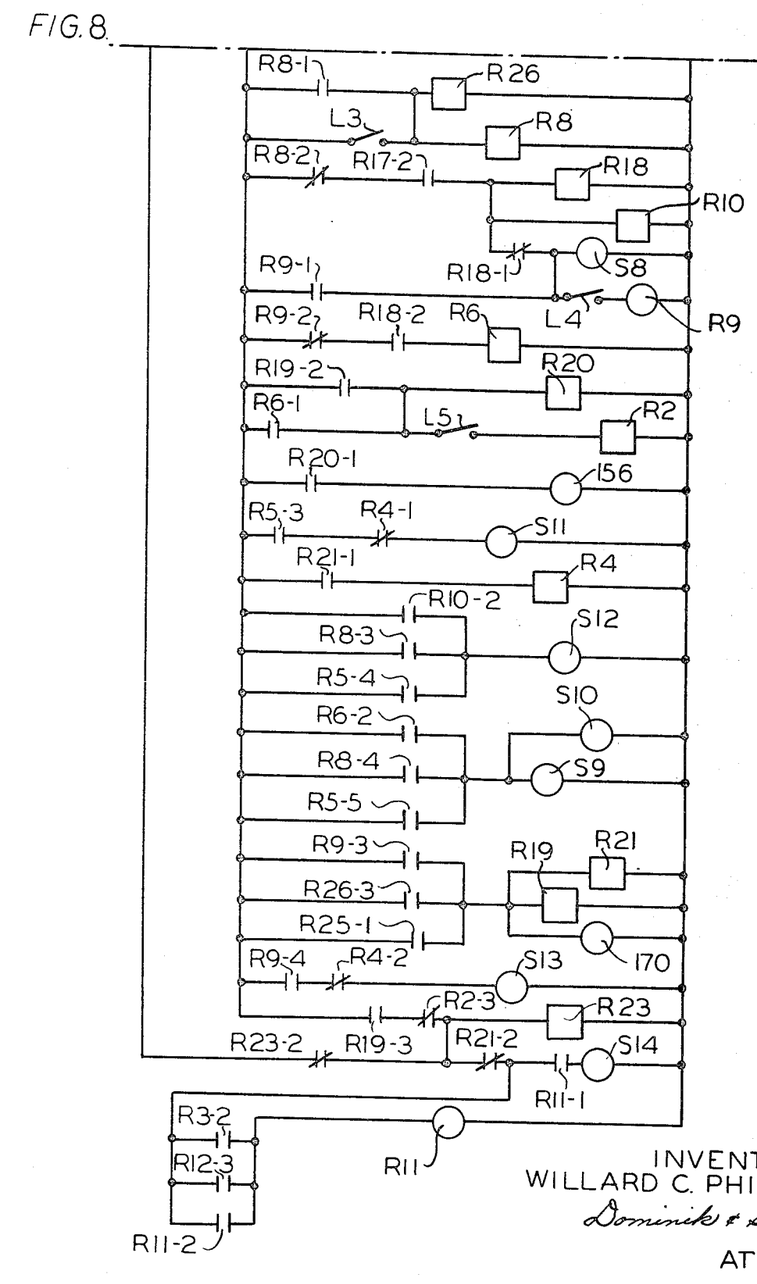

IN FIGS. 6 and 7 are shown the hydraulic, air and the electrical circuitry for the testing machine 10, which are generally enclosed within the cabinet 42 and/or the upright dial support portions 48 and 56. Hydraulic fluid is supplied to the hydraulic cylinders 100 and 110 through hydraulic lines H from a reservoir 115. Appropriate bypass and control valves are included in the hydraulic lines H to assure operation in the manner described below. A source of air (not shown) is coupled through air lines A to a number of solenoid operated valves such as the valve 118 included in the air lines for operating the different air cylinders. Generally, the test sequence is controlled by a number of relays, some of which are time delay relays. The time delay relays control the length of time of each test pressure, and each test pressure is controlled by an instrument type air pressure regulator. Limit switches are used to indicate movement of the test plug 26 and the hold plug 92, and the movement of these plugs are an indication of test results. Referring to FIGS. 6 and 7, the operation of the testing machine 10 can be generally described as follows.

Assuming that a supply of tubs 12 have been loaded into the tub dropper 30, either manually or automatically, upon operating the start pushbutton 64 which is a pushbutton of the locking type so that it functions as an on-off switch, current flows from the source of power 120 through the photocell PC. The photo cell PC and its associated light source 122 are mounted on the testing machine 10 in a position to detect the presence or absence of a tub 12 beneath the test head assembly 40, and is operative to stop operation of the testing machine 10 when the supply of tubs in tub dropper 30 is depleted. In the drawing, the photo cell contacts are shown in their operative positions when the photo cell beam is unobstructed. The stop pushbutton 55 is normally closed so that upon operating the start pushbutton 54 current flows through relay R1, causing it to operate. Contact R1–1 of relay R1 closes a hold circuit for relay R1 so that relay R1 remains operated upon release of the start pushbutton 54.

At contact R1–2 of relay R1, a circuit is closed to operate solenoid S1 and time delay relay R22. In FIG. 6, it can be seen that solenoid S1 controls a valve 124 and, upon operating, the tub dropper air cylinder 126 is actuated to cause a tub 12 to drop into one of the stations 34 of the indexing table 32. If a tub fails to drop before time delay relay R22 times out, at contact R22–1 an energizing circuit is closed to energize solenoid S2. Solenoid S2 operates a valve 125 which bleeds off the air supply to a valve 128 which normally supplies air to an air cylinder 129 which operates the indexing mechanism for the indexing table 32, thereby causing it to index 90°. The indexing table 32 engages and operates a limit switch L1 which, in turn, closes an energizing circuit for relay R12. Contact R22–2 opened when time delay relay R22 operated so that the relay R3 is not energized. Relay R12 in operating closes its contact R12–1 to energize a stepping switch 121 which operates and steps its wiper one step. At the same contact, an energizing circuit is closed for a relay R14, causing it to operate. At contact R14–1 of relay R14, the energizing circuit for solenoid S1 and time delay relay R22 is opened causing them to restore. Time delay relay R22 upon restoring opens its contact R22–1 which, in turn, opens the energizing circuit for solenoid S2 and it restores. At the same time, relay R12 is de-energized so that it restores. When relay R12 restores, its contact R12–1 opens thereby de-energizing the stepping switch 121 and the relay R14.

When relay R14 restores, the energizing circuit for solenoid S1 and time delay relay R22 is again closed, at contact R14–1. Solenoid S1 operates the tub dropper again and, if a cup fails to drop before time delay relay R22 times out, solenoid S2 is again energized, to rotate the indexing table. The same cycle of operation described above is repeated and if on the next operation, a tub fails to drop before time delay relay R22 times out, the wiper of the stepping switch 121 steps to the third contact SS–1 and closes an energizing circuit for a relay R7. Relay R7 operates and opens its contact R7–1 which, in turn, opens the energizing circuit for relay R1 and the light source 122. Relay R1 upon restoring, opens its contact R1–1, and hence its holding circuit. The testing machine 10 is now shut down and to initiate operation again, the start pushbutton 54 must be again operated. It can therefore be seen that if the tub dropper 30 is empty or a tub fails to drop after three cycles of operation, the testing machine 10 will be automatically shut down.

If a tub 12 does drop from the tub dropper 30 before the testing machine is shut down, contact PC–2 of the photo cell PC closes an energizing circuit for a relay R13 R13 which, upon operating: at its contact R13–1 opens the energizing circuit for solenoid S1 and time delay relay R22, causing them to restore; at its contact R13–2, closes a hold circuit across contact PC2; at its contact R13–3 closes an energizing circuit for solenoid S2. Solenoid S2 operates the valve 126 for the indexing mechanism for the indexing table 32 and causes it to index 90°. The indexing table 32 engages and operates the limit switch L1 which, in turn, closes an energizing circuit for the relay R3. Operation of relay R3 initiates the test cycle, by closing, at its contact R3–1, an energizing circuit for time delay relay R15 and a counter 136 which operates to count and record the test cycle. The same contact R3–1 energizes solenoid S3 which, from FIG. 6, can be seen to, upon operation, operate a valve 130 for exhausting the air from "up" side of the air cylinder 112. Simultaneously, solenoid S4 is operated. Solenoid S4 controls a valve 132 and upon operating permits a flow of air through valve 132 and a pressure regulator 133 to the "down" side of the air cylinder 112, causing its piston to move "down" (to the right as illustrated). The hydraulic cylinder 110 which is functioning as a pump delivers hydraulic fluid to the hydraulic cylinder 100, thereby causing the test plug to lower into the tub 12. Pressure regulator 133 is adjustable and is set at a pressure which, by experiment, has been determined to be insufficient to force the test plug 26 past the entrance shoulder 19 if the entrance shoulder is not larger in diameter than is desired. The test plug 26, therefore, seats on the entrance shoulder 19 and, if the entrance shoulder is in tolerance, the test plug 26 will go no further. If the test plug 26 passes the entrance shoulder 19 because of an oversize diameter, the downward movement trips or operates a limit switch L1 which is positioned to be engaged and operated by the piston 82 of the hydraulic cylinder 100. Operation of the limit switch L1 initiates a fail cycle, explained below.

Assuming that the test plug 26 seats on the entrance shoulder 19, the time delay relay R15 operates its contacts after a fixed time delay, and at its contact R15–1 opens the energizing circuit for the solenoid S4 and the counter 136. At contact R15–2, an energizing circuit is closed for a time delay relay R16, a solenoid S5, a time delay relay R24 and a solenoid S6. The solenoid S5 like solenoid S4 controls the valve 132 and operates valve 132 to cause the air to flow through a pressure regulator 140 to increase the pressure exerted on the test plug 26. Pressure regulator 140 is set at a pressure which is determined sufficient to force the annular lip 80 of the test plug 26 into the lid groove 20 of the tub, if the entrance shoulder is not smaller in diameter than the desired tolerance. The solenoid S6 controls a valve 138 for delivering air to the air cylinder 102. Upon operation of solenoid S6 the hold plug 92 is extended into the tub 12 until it engages the tub's bottom wall 24.

If the test plug 26 enters the lid groove 20, a limit switch L2 is engaged and operated by the piston 82 to open the energizing circuit for relay R24. If the test plug 26 fails to enter the lid groove 20 before time delay relay R24 times out, relay R5 is energized and initiates a fail cycle. If the test plug 26 enters the lid groove 20, this indicates that the entrance shoulder 19 and the lid groove 20 are not undersize in diameter. The test plug 26 seats on the seat 22 of the lid groove 20 until time delay relay R16 times out and starts the next test.

When time delay relay R16 times out, the energizing circuit for the solenoid S5 is opened at R16–1, and an energizing circuit for time delay relay R17 and solenoid S7 is closed at R16–2. Solenoid S7 operates a valve 142 to permit air to flow through a pressure regulator 144 to the "down" side of the air cylinder 112. The pressure regulator is set at a pressure which is insufficient to force the test plug 26 down sufficiently to crush the side wall 14 of a tub 12 having a side wall that is not thinner than the minimum tolerance. If the tub's side wall 14 crushes, the movement of the piston 82 downwardly engages and operates a limit switch L3 which, upon closing, initiates a fail cycle. If the tub's side wall does not crush before time delay relay R17 times out, the next test cycle is started.

When time delay relay R17 times out, the energizing circuit for solenoid S7 is opened at R17-1, and an energizing circuit for a time delay relay R18, a relay R10 and a solenoid S8 is closed at R17-2. Relay R10, upon operating, opens, at R10-1, the energizing circuit for solenoid S3 and solenoid S3, upon restoring, operates the valve 130 to close the exhaust port for the "up" side of air cylinder 112. Solenoid S8 upon being energized operates a valve 148 to permit air to flow through a pressure regulator 150 to the "up" side of the air cylinder 112. The pressure regulator 150 is set at a pressure which is insufficient to remove the test plug 26 from the lid groove 20 if the lid groove is not oversize in diameter. If the test plug 26 leaves the lid groove, a limit switch L4 is engaged and operated by the piston 82 of the hydraulic cylinder 100. Limit switch L4 closes an energizing circuit for a relay R9 to initiate a fail cycle. If the test plug 26 remains in the lid groove 20, the time delay relay R18 times out and at its contact R18-1 opens the energizing circuit for solenoid S8, which then restores. At contact R18-2, an energizing circuit is closed for a relay R6.

When relay R6 operates, at its contact R6-1 an energizing circuit for a time delay relay R20 is closed. Also, at contact R6-2, an energizing circuit is closed for a pair of solenoids S9 and S10. Solenoid S9 operates the valve 148 to direct the flow of air through a pressure regulator 154 which is adapted to sufficiently increase the pressure applied to the piston of the air cylinder 112 to normally remove the test plug 26 from the lid groove 20. If the test plug fails to leave the lid groove before the time delay relay R20 times out, its contact R20-1 closes an energizing circuit for an alarm 156. If the test plug 26 leaves the lid groove before the time delay relay R20 times out, the upward movement of the piston 82 operates a limit switch L5 to close the energizing circuit for a relay R2. The solenoid S10, operated when R6-2 closed, operates a valve 160 to permit air to pass through a nozzle (not shown) mounted adjacent the test head assembly 40 and adapted to blow the acceptable tub onto the conveyor 66, for transportation to another packing or loading station.

When limit switch L5 operates the relay R2, contact R2-1 opens all of the energizing circuits to prepare the testing machine 10 to start another test cycle.

Referring back to the first test in which the test plug 26 is forced into the lid groove 20, if the test plug fails to enter the lid groove before relay R24 times out, contact R24-1 closes to energize relays R5 and R25. Relay R5 in operating closes, at its contact R5-1, a holding circuit for relay R25. At its contact R5-2, it opens an energizing circuit for time delay relay R17 to prevent it from operating. At its contact R5-3, an energizing circuit is closed for a solenoid S11. Solenoid S11 controls a valve 162 which supplies air to a marking cylinder 164 to operate it to extend its piston 166. The marking cylinder 164 is affixed to the testing head assembly 40 and when operated, its piston 166 punctures a hole in the tub being tested to indicate that the tub is defective. At its contact R5-5, energizing circuits for solenoids S9 and S10 are closed also. Solenoid S9 operates the valve 148 to extend air to pressurize the "up" side of the aid cylinder 112. Solenoid S10 operates the valve 160 to permit air to pass through the nozzle for blowing acceptable tubs onto the conveyor 66, however, it is ineffective at this time to do so since the hold plug 92 is extended into and holds the tub in place. Relay R25, at its contact R25-1, closes an energizing circuit for the time delay relays R19 and R21. The same contact also energizes a counter 170 which is adapted to count and record the total number of rejected tubs. Time delay relay R21, in timing out, closes its contact R21-1 and energizes a relay R4 which, in operating, opens its contact R4-1 and hence the energizing circuit for the solenoid S11. When solenoid S11 restores, the piston 166 of the marking cylinder 164 is extracted. Contact R21-2 of the time delay relay R21 also opens and prevents a solenoid S13 from being energized. Time delay relay R19, in timing out, opens its contact R19-1 and hence opens the energizing circuit for solenoid S3. Solenoid S3 upon being de-energized operates the valve 130 to close the exhaust for the "up" side of the air cylinder 112. Contacts R19-2 and R19-3 of time delay relay R19 close energizing circuits for time delay relay R20 and a time delay relay R23, respectively. If the test plug 26 fails to leave the lid groove 20, the alarm 156 will be energized when time delay relay R20 times out and closes its contact R20-1. If the test plug 26 fails to leave the lid groove 20, the alarm 156 will be energized when time delay relay R20 times out and closes its contact R20-1. If the test plug 26 leaves the lid groove, the limit switch L5 is operated to close an energizing circuit for the relay R2. Contact R2-1 of relay R2 opens the energizing circuits for all of the components including itself. Time delay relay R23, however, is held energized through its contact R23-1 which closes when relay R23 is energized and its normally closed contact R23-2 which close an energizing circuit for relay R23 around contact R2-1. When relay R2 restores, its contact R2-1 again closes and an energizing circuit is closed through limit switch L1 (which closed when the testing machine 10 recycled) to operate relay R3. Contact R3-2 of relay R3 extends the holding circuit for relay R23 to a relay R11 which, upon operating, closes its contact R11-1 to also extend the same holding circuit to energize solenoid S13. Solenoid S13 operates a valve 172 to permit air to flow through a nozzle (not shown) for blowing the rejected tubs onto the conveyor 70 for transportation to a checking station. Time delay relay R23 times out and in doing so opens its contact R23-2 and hence its holding circuit. Solenoid S13 and relay R11 are also de-energized when the holding circuit opens, and they restore. It may also be noted that when contact R2-1 of relay R2 is closed, solenoid S1 is again energized to operate the tub dropper air cylinder 126 to drop another tub onto the indexing table to initiate the next test of a tub.

If the tub passes the first test but fails the next test due to its side wall crushing, the operation is as follows. The test plug 26, or the piston 82, operates a limit switch L3 to close energizing circuits for relays R8 and R26. The contacts of relay R8 function as follows: R8-1 closes a hold circuit for relays R8 and R26; R8-2 opens to prevent time delay relay R18 from being energized; R8-3 closes an energizing circuit for solenoid S12 to operate valve 142 to exhaust the "down" side of the air cylinder 112; and R8-4 closes an energizing circuit for solenoid S9 to operate valve 148 to pressurize the "up" side of air cylinder 112 and an energizing circuit for solenoid S10 (energization of solenoid S10 is ineffective at this time since the tub is held by the hold plug 92). Relay R26 functions to: at its contact R26-1 to open the energizing circuit for solenoid S5 to cause it to restore; at its contact R26-2 to open the energizing circuit for relay R17 to prevent it from operating; and at its contact R26-3 to close an energizing circuit for time delay relays R19 and R21 and the counter 170.

If the test plug 26 remains in the lid groove 20, when time delay relays R19 and R20 time out the alarm 156 will be energized. If the test plug leaves the lid groove, when time delay relay R19 times out to close its contact R19-2 and the limit switch L5 is operated with the movement of the piston 82 relay R2 is energized. When relay R2 operates, all of the components are de-energized except for time delay relay R23, in the manner described above. When time delay relay R23 times out, a new test cycle is again initiated.

If the tub passes the first tests, but the test plug 26 leaves the lid groove 20 on the subsequent test, an indication that the lid groove 20 is not of proper tolerance, the failure is indicated as follows. When the test plug 26 leaves the lid groove 20, the limit switch L4 is operated to extend the energizing circuit for solenoid S8 to the relay R9, causing it to operate. The contacts of relay R9 function as follows: at R9–1 a hold circuit is closed; at R9–2 the energizing circuit for relay R6 is opened; at R9–3 an energizing circuit for time delay relays R19 and R20 and for the counter 170 is closed; and at R9–4 an energizing circuit is closed for a solenoid S13. Solenoid S13 operates a valve 176 to permit air to flow to a marking cylinder 178 to extend its piston 180. The piston 180 punctures a hole in the tub to indicate the failure. When time delay relays R19 and R21 time out, the operation proceeds in the manner described above, to initiate a new test cycle.

A tub can be completely inspected in approximately 10–12 seconds. The test cycle is therefore relatively fast. Also, in actual use, it has been found that differences in wall thickness as close as one one-thousandths of an inch can be discovered and that differences in lid groove diameters as close as two one-thousandths of an inch can be detected. Accurate tolerances can therefore be easily maintained and the tubs which do not meet the specified tolerance can be visually marked to indicate the particular fault of the tub and thereafter ejected to a collection station for rejected tubs, all automatically.

It is apparent that additional tests can be incorporated into the test cycle, if desired. For example, an extending reciprocal lip can be provided on the test plug 26 which is adapted to engage the upper end of the tub as the test plug is lowered into the tub to measure its height. Appropriately positioned microswitches, air cylinders and the like would register the proper height, as the lip moves. Also, the hold plug 92 can be easily adapted to measure bottom depressions in the tub and air can be injected into the tub after the test plug 26 is seated in the lid groove 20 to test for leakage, to mention but a few of the many additional tests which can be performed.

It is also apparent that the tubs can be visually marked defective in any one of a number of different manners. For example, rather than puncturing holes into them, a stamp of a sort can be affixed to the plunger of the air cylinders so that the tubs are marked by printing rather than a punctured hole. Also, the tubs can simply be blown in a particular direction into collection bins by appropriately placed air nozzles.

Articles having oval, rectangular as well as virtually any other shape can be tested by merely providing an appropriate test plug which is adapted to test a particular configuration or configurations of the article. The operated limit switches can be properly positioned and the pressure regulators adjusted to provide a pre-established force so that innumerable tests can be performed. The dials on the testing machine 10 also provide a visual check of the pressures exerted upon the articles.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method for inspecting resilient articles for defects comprising the steps of forcibly inserting test plug means into the open rim portion of said article; correlating the force used to insert said test plug means with said article to the maximum and minimum acceptable diameters for said article; and rejecting articles requiring a force outside of the range defined by the maximum and minimum acceptable diameters for said article.

2. The method of claim 1 further including the step of timing the duration of the applied force, whereby said articles are rejected after a predetermined time duration.

3. The method of claim 1 further including the steps of forcibly inserting said test plug means into said rim portion of said articles, and correlating the force required to insert said test plug means into said rim portion to the maximum and minimum acceptable rim diameters for said article.

4. The method of claim 1 further including the steps of applying additional force to said test plug means to apply a columnar load to the side walls of said article, and rejecting articles having side walls which fail to support said additional force.

5. The method of claim 1 further including the steps of forcibly inserting said test plug means into said article; correlating the force required to insert said test plug means into said article to the maximum and minimum acceptable dimensions for said article; rejecting articles requiring a force outside of the range defined by the maximum and minimum acceptable dimensions to insert said test plug means; applying additional force to said test plug means to apply a columnar load to the side walls of said article; and rejecting articles having side walls which fail to support said additional force.

6. The method of claim 3 further including the steps of injecting air into said article to test said articles for leakage; and rejecting those articles having a predetermined leakage.

7. The method of claim 1 further including the steps of inserting holding means into said articles.

8. The method of claim 7 further including the steps of correlating the movement of said holding means into said article to the interior depth of said article; and rejecting articles having an interior depth outside of a predetermined range.

9. A method for inspecting tubs having side walls and a bottom wall, an annular lid groove in said side walls and an entrance shoulder for said lid groove for defects comprising the steps of inserting test plug means having dimensions substantially corresponding to the open end dimensions of said article into said article; applying a predetermined force to said test plug means to forcibly urge said test plug means against said entrance shoulder; correlating the movement of said test plug means to the maximum and minimum acceptable entrance shoulder dimensions; applying an additional force to urge said test plug means into said annular lid groove; correlating the force required to insert said test plug means into said lid groove to the maximum and minimum acceptable dimensions for said lid groove; applying a still additional force to said test plug means to apply a columnar load to the side walls of said article; and rejecting tubs which require a force outside of a maximum and minimum range and which have side walls which fail to support the force applied thereto.

10. The method of claim 9 further including the steps of timing each of said test cycles.

11. The method of claim 9 further including marking each of said tubs to indicate respectively the tests which a tub fails.

12. Apparatus for inspecting articles for defects comprising, in combination: test plug means; means for forcibly inserting said test plug means into the open rim portion of said article; means for correlating the force used to insert said test plug means into said article to the maximum and minimum acceptable diameters for said article; and means for rejecting articles requiring a force outside of the range defined by the maximum and minimum acceptable diameters for said article.

13. Apparatus for inspecting articles having side walls and a bottom wall, an annular lid groove formed in said side walls and an entrance shoulder for said lid groove for defects comprising, in combination: test plug means having dimensions substantially corresponding to the open end dimensions of said article; means for forcibly urging said test plug means into said article to engage said entrance shoulder; means for correlating the force and the movement of said test plug means to the maximum and minimum acceptable entrance shoulder dimensions; and means for rejecting defective articles.

14. The apparatus of claim 13 further including means for forcibly urging said test plug means into said annular lid groove; means for correlating the force required to insert said test plug means into said lid groove to the maximum and minimum acceptable dimensions for said lid groove; and means for rejecting articles requiring a force outside of a maximum and minimum range.

15. The apparatus of claim 13 further including means for applying additional force to said test plug means to apply a columnar load to the side walls of said article; and means for rejecting articles having side walls which fail to support said additional force.

16. The apparatus of claim 13 further including means for forcibly urging said test plug means into said lid groove; means for correlating the force required to insert siad test plug means into said lid groove to the maximum and minimum acceptable dimensions for said lid groove; means for rejecting articles requiring a force outside of said maximum and minimum ranges; means for applying additional force to said test plug means to apply a columnar load to the side walls of said article; and means for rejecting articles having side walls which fail to support said additional force.

17. The apparatus of claim 16 wherein said means for forcibly urging said test plug means in engagement with said entrance shoulder, into said lid groove and to apply said columnar load to said side walls comprises hydraulic means connected to said test plug means, an air cylinder coupled to said hydraulic means for operating said hydraulic means, and hydraulic and air control circuits including pressure regulating means for controlling the force applied by said hydraulic means to said test plug means.

18. The apparatus of claim 17 further comprising electrical circuit means including a plurality of limit switches, each being operable in a pre-established sequence of operation to correlate the force applied to and the movement of said test plug means to detect defective articles.

19. The apparatus of claim 18 wherein said electrical circuit means further includes a plurality of time delay relay means, each operable in a pre-established sequence of operation to time the application of force to and the movement of said test plug means and to initiate subsequent operation of said apparatus after pre-established time intervals.

20. The apparatus of claim 16 wherein said means for rejecting defective articles comprises means for marking said articles to indicate in what respect said articles are defective.

21. The apparatus of claim 20 wherein said means for marking said articles includes a plurality of air cylinder means, each operable to extend the plungers thereof to puncture a hole in said articles in a fixed position with respect to one another, said hole being indicative of the particular defect of said article.

22. The apparatus of claim 16 further including indexing table means for transporting said articles beneath said test plug means; and means for storing and dropping individual ones of said articles onto said indexing table means at pre-established intervals.

References Cited

UNITED STATES PATENTS

| | | | |
|---|---|---|---|
| 2,246,107 | 6/1941 | Ruau | 209—79 |
| 2,606,657 | 8/1952 | Berthelsen | 209—75 |
| 3,117,441 | 1/1964 | Zimmerman | 73—52 X |

M. HENSON WOOD, Jr., *Primary Examiner.*

R. A. SCHACHER, *Assistant Examiner.*